(12) United States Patent
D'amato et al.

(10) Patent No.: US 9,197,732 B2
(45) Date of Patent: Nov. 24, 2015

(54) COMMUNICATION DEVICE AND METHOD FOR A MOBILE COMMUNICATION NETWORK

(75) Inventors: Paolo D'amato, Rome (IT); Gianluca Previti, Turin (IT)

(73) Assignee: Sisvel Technology S.R.L., None (TO) (IT)

( * ) Notice: Subject to any disclaimer, the term of this patent is extended or adjusted under 35 U.S.C. 154(b) by 0 days.

(21) Appl. No.: 13/508,767

(22) PCT Filed: Nov. 5, 2010

(86) PCT No.: PCT/IB2010/055040
§ 371 (c)(1),
(2), (4) Date: May 31, 2012

(87) PCT Pub. No.: WO2011/058491
PCT Pub. Date: May 19, 2011

(65) Prior Publication Data
US 2013/0040618 A1   Feb. 14, 2013

(30) Foreign Application Priority Data

Nov. 11, 2009   (IT) .............................. TO2009A0865

(51) Int. Cl.
*H04M 3/42* (2006.01)
*H04M 1/725* (2006.01)
(Continued)

(52) U.S. Cl.
CPC ............ *H04M 1/72522* (2013.01); *H04W 4/16* (2013.01); *H04W 4/20* (2013.01); *H04W 8/26* (2013.01); *H04W 76/02* (2013.01)

(58) Field of Classification Search
CPC ..... H04W 76/02; H04W 8/183; H04W 68/00; H04M 1/274566; H04M 2207/18; H04M 2250/60; H04M 1/57; H04M 1/72519; H04M 15/06; H04M 1/56; H04M 2203/551
USPC .................................... 455/414.1, 422.1, 458
See application file for complete search history.

(56) References Cited

U.S. PATENT DOCUMENTS

| 8,478,341 B2 * | 7/2013 | Torres ........................... 455/558 |
| 2002/0137499 A1 * | 9/2002 | Lai et al. ....................... 455/418 |

(Continued)

FOREIGN PATENT DOCUMENTS

| CN | 101039488 A1 | 9/2007 |
| EP | 1 718 087 A1 | 11/2006 |

(Continued)

OTHER PUBLICATIONS

International Search Report issued Jan. 11, 2011 in PCT/IB2010/055040.

(Continued)

*Primary Examiner* — Charles Appiah
*Assistant Examiner* — Jaime Holliday
(74) *Attorney, Agent, or Firm* — Workman Nydegger

(57) ABSTRACT

A device for receiving and transmitting information in a mobile communication network includes apparatus for making a voice call to a telephone number, a memory area for storing the telephone number and at least one identifier of the mobile network operator to which the telephone number belongs. The device further includes the ability to retrieve the identifier through the mobile communication network. The device can extract the network operator identifier of the called number from a message sent automatically when setting up the voice call. The invention also relates to a communication method for a mobile communication network.

21 Claims, 5 Drawing Sheets

(51) Int. Cl.
*H04W 4/16* (2009.01)
*H04W 76/02* (2009.01)
*H04W 8/26* (2009.01)
*H04W 4/20* (2009.01)

(56) References Cited

U.S. PATENT DOCUMENTS

| | | | |
|---|---|---|---|
| 2003/0125073 | A1 | 7/2003 | Tsai et al. |
| 2005/0239452 | A1* | 10/2005 | Lin .............................. 455/425 |
| 2006/0025121 | A1* | 2/2006 | Bumiller ...................... 455/418 |
| 2007/0111714 | A1* | 5/2007 | Edwards ...................... 455/415 |
| 2008/0167074 | A1* | 7/2008 | Van Steenbergen .......... 455/558 |
| 2008/0182552 | A1* | 7/2008 | Dinh et al. ................... 455/408 |
| 2008/0186903 | A1 | 8/2008 | Hedberg et al. |
| 2009/0239576 | A1* | 9/2009 | Liao et al. .................. 455/552.1 |
| 2009/0239584 | A1* | 9/2009 | Jheng et al. .................. 455/558 |
| 2010/0027467 | A1* | 2/2010 | Wu et al. ...................... 370/328 |
| 2011/0044210 | A1* | 2/2011 | Yokota ......................... 370/259 |

FOREIGN PATENT DOCUMENTS

| | | |
|---|---|---|
| GB | 2 439 370 | 12/2007 |
| JP | 2005-525030 | 8/2005 |
| JP | 2006-121512 | 5/2006 |
| JP | 2007-235492 | 9/2007 |
| JP | 2008-5125 | 1/2008 |
| JP | 2008-244513 | 10/2008 |
| JP | 2008-539621 | 11/2008 |
| NL | 1013738 | 12/1999 |
| WO | WO 99/41921 | 8/1999 |
| WO | 03/094563 A1 | 11/2003 |
| WO | WO2004/073328 | 8/2004 |
| WO | WO2007/115545 | 10/2007 |

OTHER PUBLICATIONS

International Preliminary Report and Written Opinion issued May 15, 2012 in PCT/IB2010/055040, filed Nov. 5, 2010.
Takuya Sawada, *Jissen Nyumon Network (Practical Guide to Network)*, Practice Detailed SIP Text, Ric Telecom Corporation, Apr. 25, 2007, pp. 51-55.
Russian Office Action dated Nov. 6, 2014, issued in Russian Application No. 2012124057, filed Nov. 5, 2010, English translation only.

* cited by examiner

| Position | Name | Surname | MSISDN / tel. no. | Company | Address | MCC | MNC |
|---|---|---|---|---|---|---|---|
| 1 | | | | | | | |
| 2 | | | | | | | |
| ... | | | | | | | |

Fig. 5

COMMUNICATION DEVICE AND METHOD FOR A MOBILE COMMUNICATION NETWORK

BACKGROUND OF THE INVENTION

1. Field of the Invention

The present invention relates to a communication device for mobile communication networks. In particular, the invention is preferably and advantageously applicable to communication devices capable of connecting to the network with two or more different profiles, such as, for instance, Dual SIM telephones.

2. Present State of the Art

"Dual SIM" (Dual Subscriber Identity Module) telephones, i.e. telephones which can accommodate two SIM cards, are recently having increasing success. These devices provide their users with two or more numbers in a single telephone device, e.g. one for work calls and one for personal calls.

From the final user's viewpoint, Dual SIM telephones are devices which can receive incoming calls on both numbers associated with the two SIM cards; similarly, for outgoing calls the same device can operate by utilising one particular SIM card of the two available.

The users of Dual SIM telephones can also choose that SIM card which, from time to time, provides the lowest call cost. In fact, calls directed to numbers belonging to the same mobile network operator as that of the calling number are typically cheaper than those directed to numbers belonging to different mobile network operators.

For the user of a Dual SIM telephone it is therefore more advantageous to call a certain telephone number through the SIM card (if available) belonging to the same network operator of the called number, or through the SIM card belonging to that operator which offers the most favourable interconnection rate. In this respect, Dual SIM telephones allow the user to make use of two or more telephone numbers, even belonging to different operators, with a single telephone device, without having to carry several devices.

Some examples of Dual SIM or multi SIM telephones are known from patents WO9941921, US2003125073 and GB2439370. The devices described in these patents can accommodate several SIMs simultaneously, which can then be used for making and receiving calls. However, such devices suffer from the drawback that the selection of the SIM card to be used for making outgoing calls must be made manually by the user, which involves longer call preparation times and less ease of use of the telephone.

SUMMARY OF THE INVENTION

In order to overcome this drawback, patent WO2007115545 describes a telephone capable of housing multiple SIM cards, all of which are active simultaneously, wherein, when setting up an outgoing call, the least expensive SIM card is automatically selected based on the dialling code of the called number.

Although effective, the solution proposed by WO2007115545 has the drawback that there is no certainty that the most favourable SIM card will be associated with the called number. As a matter of fact, when the user changes the mobile network operator, he/she can keep his/her own number by making use of the so-called number portability; it follows that the automatic selection of the SIM card considered to be the most economically advantageous one for a certain operator may be inaccurate.

In order to take telephone number portability into account, patent WO2004073328 discloses the idea of providing the telephone with a database in which each telephone number is associated with a piece of information about the mobile network operator associated with that number. Prior to making an outgoing call, the SIM card to be used for making the call is selected based on the outcome of a research for the called number in the database.

In the solution proposed by WO2004073328, the database is updated by contacting a remote server, which provides for sending the requested information (e.g. via GPRS, SMS, IP, . . . ) to the telephone.

This solution has a major drawback that the remote server must store a great deal of telephone numbers (at worst, all telephone numbers of the world), must be constantly updated, and must be able to simultaneously fulfill update requests coming from a large number of telephones.

This implies great difficulty in managing the central database as well as long update times, since searching the information requested by the telephone in such a large database is a time-consuming task.

In addition, such an update system involves usage of network resources, in particular of radio resources, which are thus subtracted from the communication among the network users.

Furthermore, in all of the aforementioned cases the selection of the SIM card to be used occurs only on the basis of cost criteria, which may imply that the mobile terminal selects a SIM card associated with an operator not providing good coverage of the area where the called number is located; in such a case, therefore, the selection will not be efficient.

The object of the present invention is to provide a device capable of solving the problems suffered by the prior art.

In particular, it is an object of the present invention to provide a communication device containing information about the network operators associated with the telephone numbers stored in the phone book and capable of updating said information in a more effective manner.

It is also an object of the present invention to provide a communication method which provides, in a mobile communication device, effective updating of information identifying the network operator of a stored telephone number.

It is another object of the present invention to provide a method for retrieving and updating information about the network operators associated with telephone numbers which uses less network resources compared to the prior art.

It is a further object of the present invention to provide a mobile communication device of the Dual SIM type which selects in a more effective way the SIM card to be used for making a call.

It is yet another object of the present invention to provide a device which allows the user to specify his/her own preferences about the criteria to be used for selecting a card.

These and other objects of the present invention are achieved through a communication device and a communication method for mobile networks incorporating the features set out in the appended claims, which are intended as an integral part of the present description.

The general idea at the basis of the present invention is to provide a communication device capable of making voice calls to a telephone number by using information about the mobile network operator to which the called number belongs, wherein such information is received in response to a previous voice call.

In particular, said information, such as MNC or MCC, is received within a connection message sent to the communication device by the network when setting up the voice call.

This solution ensures a more efficient and better controlled utilisation of the communication device used for making the call.

The information about the called operator is, in fact, secure information received from a known called party, i.e. not a third party.

The reliability of this information is therefore very important to define the device usage policy, e.g. within a company it may be decided to block calls to specific operators or, for a Dual SIM or multi SIM device, it is possible to decide which SIM to use.

The retrieval of this information takes place within the normal call setup procedures, so that no dedicated connections are required which would take up network resources; in addition, said retrieval is very fast, since it does not require any research in large databases, like the prior art.

The information about the operator can be transmitted by the called device, and then be delivered by the network to the calling terminal through alert messages indicating that the called terminal is ringing, thus allowing the caller to hear the dial tone on the telephone.

In this way, without even having to complete the voice call (i.e. without the called user answering the call), it is possible to receive information about the called user's operator. This makes it possible to intervene, for instance, by blocking the call if the called number belongs to an operator not to be called, at least not by means of a given card.

Advantageously, in a Dual SIM or multi SIM device, the user can set the criteria for using the SIM cards, e.g. by entering a rating for each card and each operator; the user is thus given more control over the automatic selection of the SIM card in order to better adapt to personal needs.

Advantageously, then, in a Dual SIM device the card selection may be based on a measurement of the quality of the signal received by the device itself before the call is made, e.g. during an IDLE mode operating step.

BRIEF DESCRIPTION OF THE DRAWINGS

Further objects and advantages of the present invention will become more apparent from the following detailed description and from the annexed drawings, which are supplied by way of non-limiting example, wherein:

FIG. 5 shows an example of a database containing the information about the network operator of the called number in the device of the present invention, in accordance with an embodiment thereof.

DETAILED DESCRIPTION OF THE PREFERRED EMBODIMENTS

Figure 1:
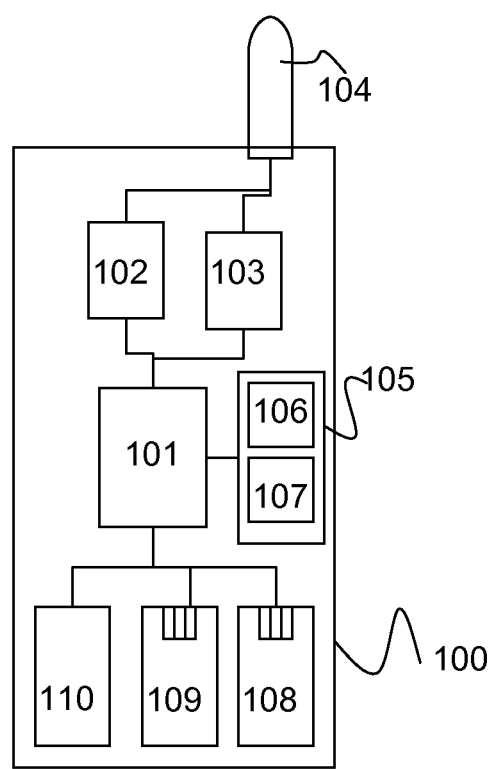
FIG. 1 shows a communication device according to the present invention.

FIG. 1 shows a communication device capable of transmitting and receiving information in a mobile communication network.

In the following description, the term mobile communication network will refer to a communication network wherein the network users are equipped with devices capable of gaining access to different points of the network and can communicate with other users (e.g. by making telephone calls or exchanging data) while on the move or while remaining stationary in a point covered by the network.

A communication device capable of receiving and transmitting information in a mobile communication network as defined above will therefore include any device, whether a telephone or a notebook or a PDA, which can gain access to the network.

In FIG. 1 the communication device 100 comprises a processor 101 acting as a device control system and communicating with a receiver 102 and a transmitter 103, in turn connected to the antenna 104.

The processor 101 is also operationally connected to means 105 providing a user interface, i.e. allowing interaction between the device and the user; said means comprise, for example, a keypad 106 and a graphic display 107.

Of course, additional means may be provided as well, such as a touch screen or joysticks, not shown in FIG. 1.

The device 100 comprises two electronic cards, designated by reference numerals 108 and 109, which contain the information required for authenticating a user in a communication network. Said electronic cards may be, for example, SIM (Subscriber identification Module) cards or USIM cards (similar to SIMs, but used for UMTS).

For simplicity, reference will be made below to SIM cards by way of non-limiting example.

The processor 101 has access to the information contained in the SIM cards 108 and 109 and in other memory areas 110 of the device in order to gain access to the network and make or receive voice calls.

In particular, within the SIM the processor retrieves the IMSI number, hereafter described with reference to FIG. 2, which is necessary for authenticating the device within the network. The IMSI ("International Mobile Subscriber Identity") number, e.g. as defined by the ETSI GSM 03.03 standard and by the subsequent 3GPP 23.003 standard ("Numbering, addressing and identification"—Section 2), univocally identifies each subscriber within the mobile communication network.

The IMSI number is associated with the SIM ("Subscriber Identification Module") card, and can therefore be transferred therewith.

Figure 2:
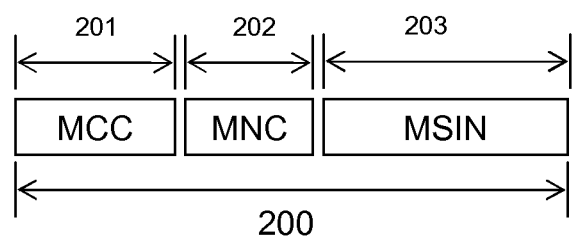
FIG. 2 shows the structure of the "International Mobile Subscriber Identity" (IMSI).

The IMSI number, indicated in FIG. 2 by reference numeral 200, comprises a variable number of digits lower than fifteen.

Within the IMSI number three parts can be distinguished, as shown in FIG. 2: the MCC number ("Mobile Country Code", indicated by numeral 201), containing 3 digits, the MNC number ("Mobile Network Code", indicated by numeral 202), containing 2 or 3 digits, and the MSIN number ("Mobile Subscriber Identity Number", indicated by numeral 203), which may contain up to 10 digits.

In particular, the MCC number identifies the country where the SIM card has been registered; the MNC number identifies the network of a particular mobile telephony operator associated with the SIM card, and the MSIN number is univocally associated with the SIM card having a particular combination of MCC and MNC numbers.

For example, an IMSI number associated with a SIM card may be composed as follows:

| | |
|---|---|
| MCC—Mobile Country Code | 222 |
| MNC—Mobile Network Code | 01 |
| MSIN—Mobile Subscriber Identity Number | 4451999 |

It follows that the IMSI number, made up of its parts (MCC+MNC+MSIN), is univocal for each user and allows the latter to be correctly identified along the path of the mobile network. All information about the mobile network user is obtained through the IMSI number, and is mainly used for authenticating the user in the mobile network and for telephone traffic payments.

Within the SIMs 108 and 109 or within the memory area 110, the processor also finds some telephone numbers saved by the user (e.g. in a phone book) or emergency numbers pre-recorded during the production stage (e.g. the police number).

Telephone numbers have a predefined structure.

Figure 3:
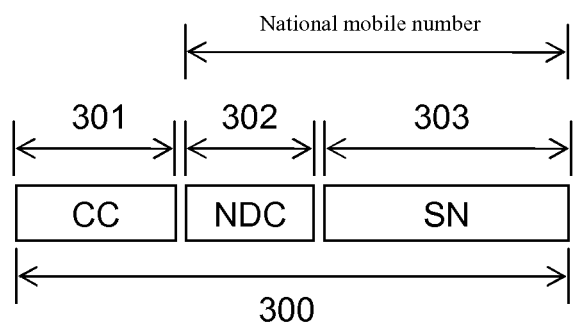
FIG. 3 shows the structure of the "Mobile Subscriber ISDN" (MSISDN).

FIG. 3 shows the structure of the MSISDN ("Mobile Subscriber ISDN") number, which according to the ETSI regulations is the telephone number associated with each mobile network user.

The MSISDN number, indicated by reference numeral 300, is made up of three parts: the CC number ("Country Code", indicated by numeral 301), the NDC number ("National Destination Code", indicated by numeral 302), and the SN number ("Subscriber Number", indicated by numeral 303); the length of the MSISDN number is variable and may contain up to 15 digits, exclusive of any dialling codes.

For example, an MSISDN number associated with a SIM card, i.e. the telephone number, may be composed as follows:

| Country Code | 39 |
| National Destination Code | 335 |
| Subscriber Number | 7699792 |

The dialling code preceding the Country Code varies from nation to nation; for example, it is '00' in Italy, '810' in Russia.

Number portability, e.g. as defined by the ETSI standards, is the possibility for the mobile network user to change the mobile network operator of the same country by modifying the IMSI number while still keeping the original MSISDN number, i.e. the same telephone number.

In particular, in GSM/UMTS networks, when using number portability the user obtains from the new mobile network operator a new SIM card containing the original MSISDN number, i.e. the old telephone number, and a different IMSI.

Number portability has been introduced in many countries in order to promote competition among the different mobile network operators. On the other hand, if only the MSISDN number is known, number portability prevents from going back with certainty to the mobile network operator of a given telephone number. However, knowing the mobile network operator of a called number would be very useful for a user having at its disposal a Dual SIM or multi SIM mobile terminal, in particular a telephone.

In fact, it would be advantageous for the user of a Dual SIM or multi SIM terminal to make a call by selecting a particular SIM card among those available, this choice depending essentially on the information about the called mobile network operator.

The following description will illustrate a method and a system for effectively obtaining reliable information about the mobile network operator of a called number.

According to this method, the information about the called number's operator is sent directly by the called user.

In particular, said information is transmitted by the called user when picking up a voice call, for example incorporated in a connection message, e.g. a "CC connect" type message transmitted in a control channel dedicated to a user establishing the call, e.g. a FACCH (Fast Associated Control Channel).

Figure 4:
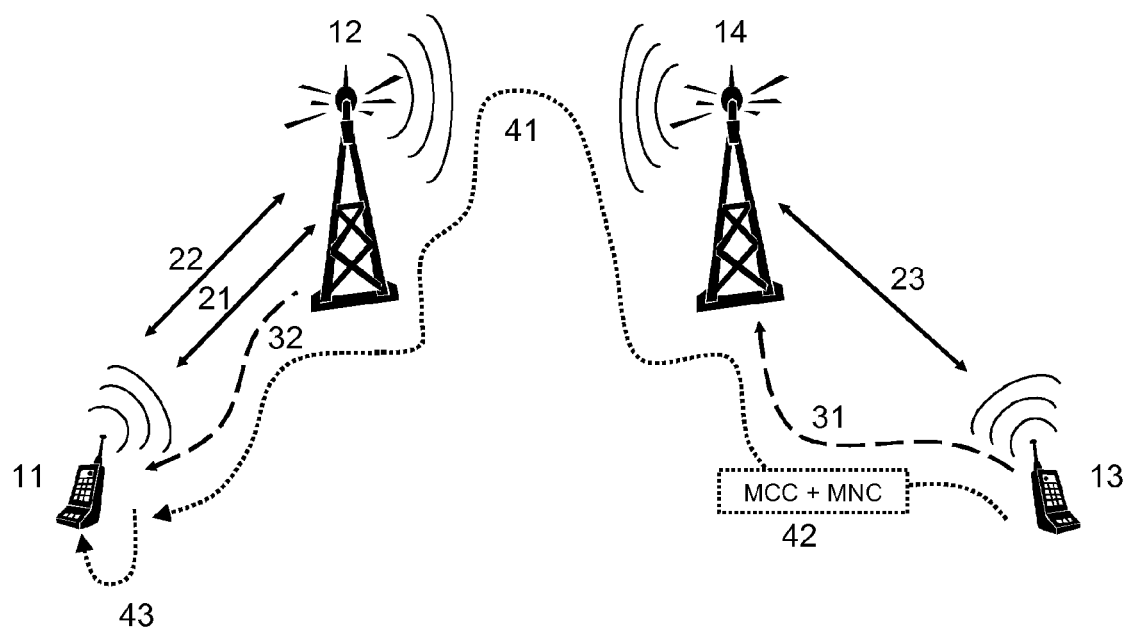
FIG. 4 shows an example of obtainment of the information about the network operator of the called number, in accordance with an embodiment of the present device.

FIG. 4 shows an example of the information flow between two mobile terminals 11 and 13, in particular to cellular telephones, establishing a voice call.

In the example of FIG. 4, the two mobile terminals 11 and 13 are registered in two different mobile communication networks, whose access networks are identified by reference numerals 12 and 14.

In particular, each mobile terminal communicates by radio with a radio base station of the access network.

The communication networks may be GSM or UMTS or LTE or WiMax networks as defined by the respective standards, and will not be described herein any further.

In the example of FIG. 4, the mobile terminal 11 makes a voice call to the mobile terminal 13.

For this purpose, several procedures are carried out which are different from standard to standard, and which cause the network to make the network resources required for making the call available to the mobile terminal, while at the same time allowing to locate and contact the terminal 13 identified by the called telephone number.

For instance, when the mobile terminal 11 is in "idle" mode and has already been authenticated in the mobile network, by dialling the telephone number on the terminal and pressing the call key the network will be notified of the intention of making a call.

A network resource assignment procedure is then started, normally called RR ("Radio Resource") connection procedure, at the end of which the network assigns the radio resources (e.g. frequencies, time-slots, etc.) and sets the modes of encryption to be used in the communication in order to protect the information transmitted along the radio channel.

The exchange of information provided for by this RR connection procedure is schematically indicated in FIG. 4 by reference numeral 21.

After the RR connection procedure 21 has been successfully completed, the real call setup step is started, which is internal to the "Call Control" (CC) procedure; at the end of the CC procedure, a connection between the calling terminal 11 and the called terminal 13 is obtained which allows the conversation between the calling user and the called user.

During the CC procedure, much information 22 is exchanged between the calling terminal 11 and its network 12; likewise, much information 23 is exchanged between the called terminal 13 and its network 14.

In particular, the called terminal 13 sends to the mobile network 14 a CC connection message 31.

Said connection message 31 is generated and transmitted by the called terminal when setting up the call, i.e. during one of the connection procedures (following the call from the calling terminal, but preceding the establishment of a voice communication between the called terminal and the calling terminal), wherein the called terminal communicates with the network.

In a possible embodiment, the message 31 is generated and transmitted by the called terminal 13 when picking up the call, i.e. when the user of the called terminal presses the answer key on the called terminal 13.

In a possible embodiment, the connection message 31 is preferably a "terminal connected" message which allows the network to be notified that the called user wants to accept the call.

Alternatively, the connection message 31 is an alert message which is sent to the network by the called mobile terminal in order to indicate that the called terminal has been alerted and is signalling the incoming call to its user, e.g. it is ringing or vibrating.

The network 14 then communicates with the network 12, which sends to the calling terminal 11 a second CC connection message 32 dependent on the message 31.

This second connection message 32 is sent to the calling terminal 11 by the mobile network 12 to notify that the called user 13 has accepted the call (if the connection message 31 is a "terminal connected" message) or that the called terminal has been contacted (if the connection message 31 is an alert message).

In a preferred solution, the CC connection messages 31 and 32 carry at least one common piece of information that identifies the operator of the network to which the called telephone number belongs.

Some examples of connection messages which may be used for this purpose are the "CC Connect" messages described in the 3GPP TS 24.008 specification, section 9.3.5, or the "CC Alerting" messages contained in section 9.3.1 of the same specification.

In this case, the connection messages 31 and 32 are both made up of a plurality of information elements (IEs).

In particular, an information element contained in both the "CC Connect" message and the "CC Alerting" message is the one called User-User, which, according to the standards, is present in both messages 31 and 32.

Said information element is therefore transported by the terminal 13 to the terminal 11 along the path 41 indicated by a dotted line in FIG. 4.

The User-User information element 42 has a variable length of preferably 3 to 131 bytes, so that it can include the MNC number and, more preferably, both the MCC and MNC numbers of the called number.

The terminal 13 comprises means for entering information about the network operator that issued the SIM card associated with the number called by the terminal 11 into a connection message to be sent to the network in response to a voice call.

The terminal 13, which is not necessarily a Dual SIM telephone, comprises means for interrogating the SIM card and extracting the MNC (and possibly also the MCC) from the IMSI, as well as further means, in particular code portions executed by a processor, for entering said MNC number (and possibly also the MCC) into the above-described connection message (in particular, into the "CC Connect" or "CC Alerting" message).

According to an embodiment of the present invention, during the CC procedure the called user's telephone 13 enters automatically its own MCC and/or MNC numbers into the User-User information element 42 which is transmitted along the path 41.

The MCC and MNC numbers may be appropriately encrypted or expressed in a predefined format which can be received and understood by the receiving terminal.

Of course, as explained above, the terminal 13 may just enter the MNC number, but reference will be made below to an example wherein the terminal 13 enters both the MNC and the MCC.

The calling terminal 11 receives the CC connection message 32, extracts the MCC and MNC numbers contained in the received User-User element, and then stores them into a memory area of the terminal.

In particular, the MNC and MCC numbers are associated with the called telephone number stored in the memory of the telephone, e.g. as will be described in detail with reference to FIG. 5.

In a possible embodiment, the processor 101 immediately analyses the MNC and MCC numbers and decides whether to interrupt the call or not as a function of predetermined criteria, e.g. specifying that a given operator cannot be called by using a given SIM card.

When a subsequent call is made, the MCC and MNC numbers of each telephone contact saved in the phone book (comprising, for example, telephone numbers stored in the SIM cards as well as telephone numbers stored in the mobile terminal) can be retrieved and possibly updated every time the user calls the corresponding MSISDN number, i.e. the telephone number.

The transmission of this information occurs every time the connection between the calling mobile device and the called one is established, without any additional cost for either user, and without any particular usage of network resources.

FIG. 5 shows an example of a database used for storing the information obtained through the CC connection message.

For the purposes of the present description, the term "database" will refer to any memory area containing pieces of information which can be re-connected to one another in a logical manner within a table-like structure through appropriate code instructions of a processor.

In this sense, the term "database field" will refer to a memory area, and the term "database record" will refer to instructions and logic connections among appropriate memory areas (fields of one record).

Thus, the expression "to verify the information in a database" or "to read the records of a database" will mean to execute appropriate code instructions which provide orderly access to certain memory areas.

In the example of FIG. 5, the database 500 collects the information contained in the phone book of the mobile terminal and, as explained above, it may be physically stored in one or more memory areas of the device 100 according to the present invention, e.g. in the memory area 110 or in the SIM cards 108 and 109.

Each database record (or row) thus includes a series of fields useful for identifying the telephone contact, such as, for example, a database progressive number 501 ("Position"), "Name" of the telephone contact (502), "Surname" of the telephone contact (503), "MSISDN" or "telephone number" (504), "Company" and "Address" of the telephone contact (designated by reference numerals 505 and 506, respectively).

The database 500 further comprises a field 507 storing the MCC number of the operator that issued the SIM of the telephone number of the telephone contact, as well as a field 508 storing the MNC number of the same operator.

Of course, if the terminal 11 receives just the MNC in the connection message 32, then only the MNC field will be updated.

It should be pointed out that the retrieval of the information about the MNC number (and possibly also the MCC number, so as to ascertain whether the called number belongs to the same country or not) by means of the User-User field of the information message does not imply any additional cost and does not require any changes to the architecture and/or protocol of the mobile telephony network.

Still according to the present invention, once the MNC number retrieved as described has been associated with the telephone number that the user wishes to call, the selection of the SIM is made automatically by the telephone device.

The selection takes place in accordance with predetermined criteria, which may preferably be set by the user through the interface means 105.

In a possible embodiment, in order to carry out this automatic selection, the processor 101 of the device 100 first calculates the value of a first variable $N_i$ associated with the MNC identifier of the called mobile network, and then compares it with the MNC number of the SIM in use, for each SIM card (i=1 . . . N).

This value may be predefined in the device; for example, $N_i$ is high when the calling and called terminals belong to the same mobile network operator (i.e. they have the same MNC), whereas $N_i$ is low when the users belong to different operators (i.e. they have different MNCs) or the called user's operator is unknown (MNC unavailable); preferably, the value of $N_i$ is between 0 and 1.

The criteria for calculating the value of $N_i$ can be modified (or possibly entered for the first time, if there are no pre-defined criteria) by the user by expressing (through the interface means 105) his/her own preferences for each SIM card in combination with calls towards each of the other operators.

Preferably, these criteria can be expressed by means of an intuitive evaluation of the preference for calling a certain operator with a certain card, e.g. by specifying for each card and for each operator to be called a variable value between zero and five "stars".

This solution allows to take into account the particular existing contractual conditions, known to the user, for each one of the SIM cards.

Preferably, the processor 101 of the device 100 calculates the value of a second variable $R_i$ associated with the quality of the signal received by the communication device for each one of the SIM cards (i=1 . . . N).

As known, even when in "idle" mode the device must be listening to the "paging channel" in order to be able to answer calls and to estimate the quality of the signal in accordance with the network specifications required by the network (GSM, UMTS, HSDPA, . . . ) by calculating the signal-to-noise ratio (S/N) or the RSSI ("Received Signal Strength Indication") of the network.

The RSSI is preferably calculated as the mean value of a given number of samples of the signal received on a predetermined channel (e.g. the Broadcast Channel in GSM or the Pilot Channel in UMTS).

The RSSI is therefore related to the intensity of a signal measured in a predetermined channel.

Dual SIM or multi SIM telephones can, even in "idle" mode, examine the RSSI of each one of the mobile networks associated with their SIM cards, and can therefore calculate the value of which, for example, is high when the RSSI is good, or low when the RSSI is poor; preferably, the value of $R_i$ is between 0 and 1.

As an alternative, $R_i$ may coincide with the RSSI measurement.

According to a possible embodiment, the selection of the SIM card may occur as a function of the quality of the channel measured by the terminal.

For example, the selected SIM card will be the one having the highest $R_i$.

According to a possible embodiment of the present invention, the automatic selection of the most advantageous SIM is made by evaluating a function of the variables $N_i$ and $R_i$, e.g. in the form of:

$$F_i = a_1 N_i + a_2 R_i$$

for each one of the SIM cards (i=1 . . . N) of the telephone.

The coefficients $a_1$ and $a_2$ are defined according to the user's preferences, so as to give more or less weight to the variables associated with the identifier of the called mobile network or to the quality of the signal. In this manner, the user can signal to the processor 101 whether he/she prefers to use the SIM card offering the best signal quality, so as to get a clearer call, or the least expensive SIM card, so as to spend less money for the call.

In a preferred solution, the sum of the parameters $a_1$ and $a_2$ is 1, and the user can choose, through a scroll bar (e.g. displayed on a touch screen), which aspect to privilege, whether signal quality or cost, while being able to select all intermediate positions with the bar.

Depending on the bar position, the processor 101 determines the chosen values of $a_1$ and $a_2$, which are then suitably stored into a memory area of the mobile terminal 100.

When a call must be made, the processor 101 calculates the function $F_i$ for each one of the SIM cards (i=1 . . . N) and selects that SIM card which gives the highest value of $F_i$.

For example, a Dual SIM telephone device according to an embodiment of the present invention, which internally accommodates two SIM cards, will first determine the value of the variables relating to the first card ($N_1$ and $R_1$) and to the second card ($N_2$ and $R_2$), and then, the values of the parameters $a_1$ and $a_2$ being known, it will calculate the values of the functions $F_1$ and $F_2$ relating to both SIM cards. At this point, if $F_1 > F_2$, the first SIM card will be used for making the call; otherwise, if $F_1 < F_2$, the second SIM card will be selected.

This method is of course also applicable to a number of SIM cards greater than 2.

Finally, in the event that, when receiving the CC connection message, it is verified that the MNC number of the called device has changed, such information will be updated and stored. A this point, it is conceivable that said change is notified to the calling user, who may then choose whether to hang up or have the call stopped automatically and the value of $F_i$ recalculated based on the updated information.

It is apparent that many changes may be made to the present invention by those skilled in the art without departing from the protection scope thereof as stated in the appended claims. For example, it is clear that the identifier of the mobile network operator of the called device, transmitted through the User-User information element, may be different from the MNC number and consist, for example, of an alphanumeric string encoded in accordance with any type of coding. Anyway, the use of the MNC number and of other codes combined therewith is considered to be more advantageous because it has already been provided for by the ETSI standards.

Furthermore, if the network identifier of the called device (e.g. the MNC number) is not available in the memory of the telephone, the choice may be based on the evaluation of the RSSI alone, i.e. by fixing the value of the variable $N_i = 0$. Alternatively, the value of $N_i$ may be based on the telephone dialling code (i.e. the NDC number in the MSISDN number) which, if the operator has not been changed by using number portability, is a good indicator of the mobile network operator of the called number.

In addition, it is conceivable to vary, for each SIM card in the device, the value of the parameters of the function $F_i$, i.e. $a_1$ and $a_2$. In this way, for each SIM card it will be possible to express a different preference; for example, if a SIM card of a given operator exhibits good signal reception quality, more weight may be given to the parameter $N_i$ associated with the identifier of the called mobile network for better economy.

It is also apparent that the present invention, while being preferably and advantageously applicable to Dual SIM or multi SIM communication devices, is not however limited thereto.

For example, even a single-SIM communication device may comprise a database of the type described above and shown in FIG. 5, containing information about the network operator to which a given telephone number belongs.

Such information about the operator, retrieved and possibly updated according to the above-described method, may be used by the processor of the communication device to decide whether or not to make calls or whether or not to notify the user (e.g. through an audible or visual alarm) that the device is about to call a number belonging to a particular operator, e.g. an operator towards which the rate is particularly unfavourable.

In this case as well, the decision about whether the call may be made or not may occur by calculating a parameter $N_i$ of the type previously described. If $N_i$ is lower than a certain threshold, then the call will not be made or an alarm will be generated as described above.

Finally, according to a variant of the present invention, if a user calls a telephone number by manually entering the digits thereof instead of loading the number from the phone book, the telephone will temporarily record the called telephone number and, when it receives the identifier of the network operator with which the called number is associated, it will store it as well.

In a preferred solution, at the end of the call a screen is displayed on the display of the calling terminal where it is possible to update the phone book by entering a new telephone contact whose number is the one just called and whose operator identifier is the one received in response to the call.

As an alternative, the phone book may be updated automatically, even without creating a contact visible to the user.

In this way, if the telephone call again the same telephone number dialled by the user, it will be able to select the best SIM card (if the device is a Dual SIM or multi SIM telephone) or to prevent the call from being made, as previously described.

The invention claimed is:

1. A device for receiving and transmitting information in a mobile communication network, comprising:
   means for making a voice call to a called telephone number of a called device,
   a memory area adapted to store said called telephone number and at least one identifier of a mobile network operator to which said called telephone number belongs, and
   means for retrieving said at least one identifier of said mobile network operator through said mobile communication network,
   wherein said means for retrieving said at least one identifier are further adapted to extract said at least one identifier from a message which is automatically originated from said called device in response to a request to establish said voice call, and which is sent automatically to said device when setting up said voice call.

2. A device according to claim 1, wherein said at least one identifier is contained in a field of an information element of a connection message sent through said mobile communication network to said device.

3. A device according to claim 2, wherein said connection message is sent when said voice call is picked up and allows said device to be notified that the called telephone number has accepted the voice call.

4. A device according to claim 2, wherein said connection message is an alert message indicating that a mobile terminal associated with the called telephone number has been alerted and is signaling the incoming call to the respective user by ringing or vibrating.

5. A device according to claim 1, wherein said at least one identifier comprises an MNC (Mobile Network Code) number of the called telephone number.

6. A device according to claim 5, wherein said at least one identifier further comprises a MCC (Mobile Country Code) number of the called telephone number.

7. A device according to claim 1, comprising at least two electronic cards which comprise information for authenticating a user in a mobile communication network and automatic selection means for the automatic selection of one of said at least two electronic cards.

8. A device according to claim 7, wherein said automatic selection means are adapted to select said one card depending on said at least one identifier of the mobile network operator and on predefined selection criteria.

9. A device according to claim 8, wherein said criteria can be set by a user of said device.

10. A device according to claim 9, wherein said criteria can be set through a control bar.

11. A device according to claim 8, wherein said automatic selection means are adapted to select said one card depending on the quality of the signal received from said mobile network.

12. A device according to claim 11, wherein said automatic selection means are adapted to select said one card depending on the intensity of a signal measured in a predetermined channel.

13. A device according to claim 11, wherein said at least one card is selected according to the following function:

$$F_i = a_1 N_i + a_2 R_i$$

where $N_i$ is a variable associated with said identifier; R is a variable associated with the quality of the signal of said mobile network, and $a_1$ and $a_2$ are constant coefficients which can be defined by the user.

14. A device according to claim 1, further comprising means adapted to prevent making a call to a telephone number based on said identifier of said mobile network operator.

15. A device according to claim 1, further comprising means for manually entering said telephone number and means adapted to store said entered telephone number and said identifier into memory area of said device.

16. A device for receiving and transmitting information in a mobile communication network, comprising
   means for answering a voice call from a calling device,
   at least one electronic card, comprising information for authenticating a user in a mobile communication network and a network operator identifier, and
   means for entering said network operator identifier into a connection message in response to an incoming connection request originated from said calling device, and
   means for automatically transmitting said connection message to said calling device when setting up said voice call.

17. A device according to claim 16, wherein said connection message is sent when said voice call is picked up and allows said network to be notified that the call has been accepted.

18. A device according to claim 16, wherein said connection message is an alert message indicating that the device has been alerted and is signalling the incoming call to the respective user by ringing or vibrating.

19. A device according to claim 16, wherein said identifier comprises an MNC number of said operator and an MCC number of said operator.

20. A communication method for a mobile communication network, comprising the steps of:
   making a voice call to a called device having a called telephone number, by means of a calling device, as said voice call is being set up, receiving, on said calling device a message originated from said called device in response to a request to establish said voice call, and which is sent through said mobile communication network, said message containing at least one identifier of the mobile network operator to which said called telephone number belongs, extracting said identifier from said message, storing said identifier on said calling device and associating said identifier with said called telephone number.

21. A method according to claim 20, further comprising the steps of:

making a second call to said called telephone number by using an electronic card selected from at least two electronic cards, wherein said electronic card contains information adapted to authenticate a user in a mobile communication network, and wherein said card is selected depending on said identifier and/or on criteria predefined by a user and/or on a measured quality of the signal received before making said second call.

\* \* \* \* \*